[12] United States Patent
Kummerow et al.

(10) Patent No.: US 12,028,261 B2
(45) Date of Patent: Jul. 2, 2024

(54) OPTIMIZING DATA PRIORITY BY MANAGING NETWORK RESOURCES

(71) Applicant: SOCIAL MICROPHONE, INC., Palo Alto, CA (US)

(72) Inventors: Uwe Kummerow, Marl (DE); Kenneth N. Sherman, Montecito, CA (US)

( * ) Notice: Subject to any disclaimer, the term of this patent is extended or adjusted under 35 U.S.C. 154(b) by 320 days.

(21) Appl. No.: 17/633,940

(22) PCT Filed: Aug. 11, 2020

(86) PCT No.: PCT/US2020/045805
§ 371 (c)(1),
(2) Date: Feb. 8, 2022

(87) PCT Pub. No.: WO2021/030369
PCT Pub. Date: Feb. 18, 2021

(65) Prior Publication Data
US 2022/0303223 A1 Sep. 22, 2022

Related U.S. Application Data

(60) Provisional application No. 62/885,360, filed on Aug. 12, 2019.

(51) Int. Cl.
*H04L 12/26* (2006.01)
*H04L 47/12* (2022.01)
(Continued)

(52) U.S. Cl.
CPC .......... *H04L 47/2441* (2013.01); *H04L 47/12* (2013.01); *H04L 47/803* (2013.01)

(58) Field of Classification Search
CPC ..... H04L 47/10; H04L 47/2441; H04L 47/30; H04L 47/32; H04L 12/5693; H04L 47/12;
(Continued)

(56) References Cited

U.S. PATENT DOCUMENTS 5,541,987 A * 7/1996 Topper .................... H04L 47/70
379/230
5,881,050 A * 3/1999 Chevalier ............. H04L 47/801
370/254
(Continued)

FOREIGN PATENT DOCUMENTS

EP 3047624 7/2017
KR 1020110033088 A 3/2011
KR 1020120079279 A 7/2012

OTHER PUBLICATIONS

ISA/KR, International Search Report and Written Opinion for PCT/US2020/045805 dated Nov. 17, 2020, 12 pages.
(Continued)

*Primary Examiner* — Phuongchau Ba Nguyen
(74) *Attorney, Agent, or Firm* — James A Cardle (57) ABSTRACT

Methods of network operation are disclosed herein that may reduce congestion on a network. The methods of network operation may include the steps of communicating data between a network and several clients and placing each client of the several clients in VoIP communication with the network. The methods of network operation may include the step of tagging data being communicated by each client with the network with a Quality of Service (QoS) level, and the step of setting the QoS level for each client. The methods of network operation may include the step of reducing congestion of the network by controlling a quantity of data being communicated by each client with the network.

8 Claims, 3 Drawing Sheets

(51) Int. Cl.
*H04L 47/2441* (2022.01)
*H04L 47/80* (2022.01)

(58) Field of Classification Search
CPC ... H04L 47/803; H04L 65/1089; H04L 65/80; H04L 47/24
See application file for complete search history.

(56) References Cited

U.S. PATENT DOCUMENTS

| | | | |
|---|---|---|---|
| 6,570,855 B1 * | 5/2003 | Kung | H04M 15/8016 379/221.02 |
| 6,934,249 B1 * | 8/2005 | Bertin | H04L 47/724 370/238 |
| 8,472,430 B2 | 6/2013 | Milstein et al. | |
| 8,972,537 B2 | 3/2015 | Bastian et al. | |
| 9,331,950 B2 | 5/2016 | Ho | |
| 2002/0141345 A1 * | 10/2002 | Szviatovszki | H04L 45/50 709/241 |
| 2007/0230443 A1 * | 10/2007 | Milstein | H04L 12/66 370/352 |
| 2014/0064084 A1 | 3/2014 | Paladugu et al. | |
| 2014/0119179 A1 * | 5/2014 | Ho | H04L 47/2483 370/230 |

OTHER PUBLICATIONS

European Search Report Appl. No. EP 20 65 3464, dated Aug. 22, 2022.

* cited by examiner

OPTIMIZING DATA PRIORITY BY MANAGING NETWORK RESOURCES

REFERENCE TO RELATED APPLICATIONS

This application claims the benefit of the priority date of U.S. provisional application 62/885,360, filed Aug. 12, 2019, the contents of which are incorporated herein in their entirety.

BACKGROUND OF THE INVENTION

Field

The present disclosure relates to network communication, and, more particularly, to methods and related apparatus that, for example, reduce latency in communications between a server and multiple clients over the network.

Background

Network, as used herein, may include the Internet cloud, as well as other networks of local to global scope. Network may include, for example, cellular telephone networks (e.g. 4G or 5G), text messaging networks (such as MINIS or SMS networks), local area networks (LANs), wide area networks (WANs), and combinations thereof, as would be readily recognized by those of ordinary skill in the art upon study of this disclosure. Network may include, for example, data storage devices, input/output devices, servers, routers, switches, databases, computers, wireless communication devices, access points, cellular networks, optical devices, cables and other communication pathways, and other hardware and operable software, as would be readily recognized by those of ordinary skill in the art upon study of this disclosure. Network may be wired (e.g. optical, electromagnetic), wireless (e.g. infra-red (IR), electromagnetic), or a combination of wired and wireless, and the network may conform, at least in part, to various standards, (e.g. Bluetooth®, ANT, ZigBee, FDDI, ARCNET IEEE 802.11, IEEE 802.20, IEEE 802.3, IEEE 1394-1995, USB).

Certain networks may include clients numbering in the hundreds or even thousands connected to a specific segment of the network. These clients are generally configured as computers. In addition, there may be other clients not connected to the network but in close proximity to the network. As used herein, computer may include, for example without limitation, single-processor or multiprocessor computers, system-on-a-chip, minicomputers, mainframe computers, personal computers, cloud-based computing, hand-held computing devices, mobile devices, cellular telephones, smartphones, tablets, watches, microcontrollers, and other processor-based devices, as would be readily recognized by those of ordinary skill in the art upon study of this disclosure. Computer, in various implementations, may include memory, display, mouse, keyboard, data storage device(s), I/O device(s), and so forth, as would be readily recognized by those of ordinary skill in the art upon study of this disclosure. Use of the term client herein does not necessarily imply and particular network hierarchy or network architecture.

Clients, whether connected to the network or not, may perform certain actions. For example, a client may maintain a list of Wi-Fi networks termed known networks to which the client has been connected in the past, and the client may continually probe in search of a known network or in search of a better access point to the network. This probing creates congestion as described below. In addition, many clients may be communicating data via the network, for example, by browsing the Internet, tweeting, or downloading email. Congestion caused by client activity on the network creates unacceptable latency in data communication, for example, between multiple clients and a server with which the multiple clients are communicating via the network. Latency, as used herein, refers to delay in the communication of data packets on the network, and jitter refers to changes in latency.

As an example, it may be theoretically possible, but not practical, to avoid network congestion by asking the user of every client that may communicate with the network to turn the client off or to use Airplane Mode. Asking users to turn their clients off for brief periods of time could increase compliance, but not enough to solve the network congestion or latency problems.

Currently, in various practical implementations, a buffer is added to facilitate data communication. However, the buffer may triple the latency resulting in unacceptable data communication performance of the network. For example, a user speaks sounds into a client that communicates the sounds as data to a server via the network, and the server transforms the data into audio broadcast from a speaker. In this example, latency in data communication via the network results in the user hearing a delay in the sounds broadcast from the speaker with respect to the sounds spoken into the client, which may be disturbing to the speaker. Use of a buffer, in this example, increases the latency, and, thus, increases the delay between the sounds spoken into the client and the sounds broadcast from the speaker. Latency in data communication via the network may cause other problems in other implementations.

Accordingly, there is a need for improved apparatus as well as related methods that eliminate network congestion including latency in data communication between, for example, multiple clients and a server via a network.

BRIEF SUMMARY OF THE INVENTION

These and other needs and disadvantages may be overcome by the methods and related apparatus and compositions of matter disclosed herein. Additional improvements and advantages may be recognized by those of ordinary skill in the art upon study of the present disclosure.

In various aspects, the methods of network operation disclosed herein includes the steps of communicating data between a network and several clients and placing each client of the several clients in VoIP communication with the network. The methods of network operation may include the step of tagging data being communicated by each client with the network with a Quality of Service (QoS) level, and the step of setting the QoS level for each client. The methods of network operation may include the step of reducing congestion of the network by controlling a quantity of data being communicated by each client with the network. In various aspects, the step of reducing congestion of the network by controlling a quantity of data being communicated by each client with the network may include the step of prompting each operating system of each client into initiating a VoIP connection with the network, the step of generating data by activating a data source of each client thereby initiating a process of an operating system of each client affecting data communication of each client with the network, and the step of dumping the data from a network stack on at least one client of the several clients thereby preventing transmission of the data over the network from the at least one client. The data source may be selected as a microphone, a camera, or a sensor, in various aspects.

In certain aspects, the methods of network operation may include the step of restricting a quantity of data communicated with a network from all clients of the network other than a selected client during communication with the network of data from a microphone of the selected client, there being at least two clients of the network. In certain aspects, the methods of network operation may include the step of unrestricting the quantity of data communicated with the network from all clients of the network other than during communication with the network of data from the microphone of the selected client.

In certain aspects, the methods of network operation may alter a network between a noisy state of operation having several clients in unrestricted data communication with the network and a quiet state of operation. Certain of the clients are in restricted data communication in the quiet state of operation. Related apparatus and compositions of matter are also disclosed herein.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

The Figures are exemplary only, and the implementations illustrated therein are selected to facilitate explanation. The Figures including the apparatus, methods, and compositions of matter illustrated in the Figures are not to be considered limiting unless expressly so stated. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The steps in the various methods illustrated in the Figures, for example, may be performed in other orders, or the steps in the various methods may be divided or subdivided in various ways, in other implementations. Methods, in other implementations, may include steps additional to those illustrated or may not include certain steps of the illustrated methods. Information flows and process flows in the Figures included herein are indicated by arrows, and are selected for explanatory purposes. It should be understood that other information flows may occur between various components and that other process flows may occur, in various other implementations. The number, position, relationship and dimensions of the elements shown in the Figures to form the various implementations described herein are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the Figures and are utilized to facilitate description thereof. Use herein of relative terms such as generally, about, approximately, essentially, may be indicative of engineering, manufacturing, computational, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

In various aspects, methods and related apparatus disclosed herein minimize congestion on a network that is communicating with several clients by, for example, emulating the shutdown of data communication of clients other than a selected client with the network. All clients other than a selected client are placed in a defined state wherein the clients communicate only a restricted quantity of data with the network, thereby minimizing network congestion on the network, in various aspects. In various aspects, some of the clients may be placed in the defined state wherein the clients communicate only a restricted quantity of data with the network and a remainder of the clients are allowed to communicate variously a non-restricted quantity of data with the network or partly restricted quantity of data with the network.

The several clients may number on the order of 10, $10^2$, $10^3$, or more, in various aspects. The methods may include initiation of a sequence of events in an operating system of each client that limits data communication between each client and the network, in various aspects. When so initiated, for example, this sequence of operations may limit data communicated with the network to only data generated by a data source of each client, and the data source may vary from client to client. The data source may include, for example, a microphone, a camera, or a sensor of the client. The sensor may be, for example, a temperature sensor or a device orientation sensor. In various aspects, methods may initiate the sequence of operations with permission of a corresponding user of each client, automatically, and with minimum inconvenience to the user of each client.

In various aspects, the first step of an exemplary method is registering each client of the several clients with the network and then installing a client app on each client of the several clients.

At the second step of the exemplary method, in various aspects, a network resource manager sends data to the client app on each client via the network that causes the client app to temporarily activate the client's data source. In various operating systems, activating the data source may initiate a sequence of operations that prevents the client from communicating any data with the network other than data generated by the data source. In such aspects, the data sources of all clients are generating data that normally would be communicated to the network upon completion of the second step.

However, the third step of the exemplary method, in various aspects, applies to all clients except for a selected client that is designated from all the clients by the network resource manager. The data source of the selected client, such as a microphone of the selected client, is the only data source that is allowed to communicate data with the network in a normal manner in various aspects. Data from the data sources of all clients other than the selected client is either attenuated or dumped entirely as necessary so that either minimal data or no data from the data sources of all clients other than the selected client is communicated with the network, in various aspects. The selected client is allowed to send data from the data source to the network, and the selected client may be prevented from sending data to the network other than data generated by the selected client's data source, in various aspects.

As an example, consider several clients arrayed within an auditorium all in communication with the network with one client being designated as the selected client. The clients may all be smartphones, and the data source of each client is selected as a microphone, in this example. Data from the data source (e.g., the microphone) of the selected client is then communicated with the network, in this example. Clients other than the selected client, in this example, communicate either no data or minimal data with the network. Note that clients may save power by watching every network connection to detect idle connections. If no data is being communicated, the client may first lose priority status first and then the network connection may be closed. Thus, some minimal data may be communicated from each client with the network in order to preserve priority status and prevent closure of the network connection, in various aspects.

Accordingly, the network is substantially free of competing data (congestion) from clients other than the selected client, in this example, to allow communication of data from the data source (e.g., audio data from the microphone) from the selected client via the network with minimum latency and maximum fidelity. The data communicated via the network from the selected client may then be broadcast to the auditorium via speaker(s) in operable communication with the network, in this example.

Figure 1A:
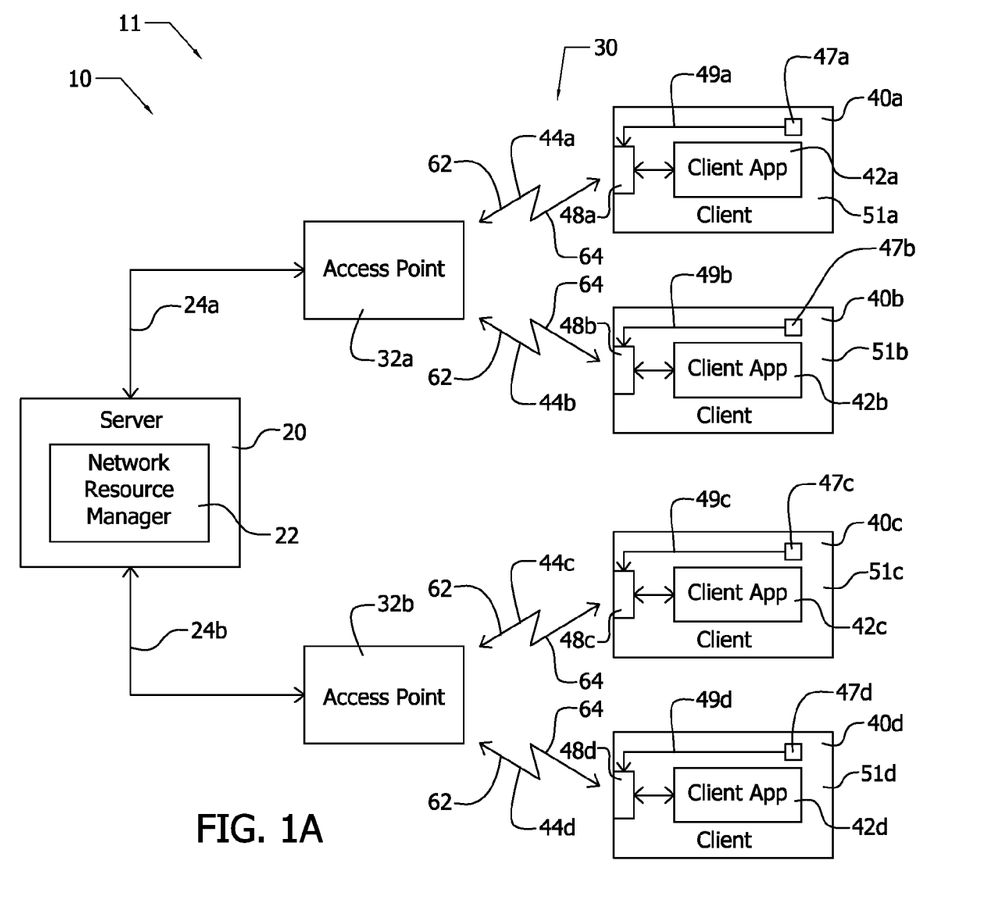
FIG. 1A illustrates by schematic diagram and exemplary implementation of a network communication system in a noisy state of operation.
Figure 1B:
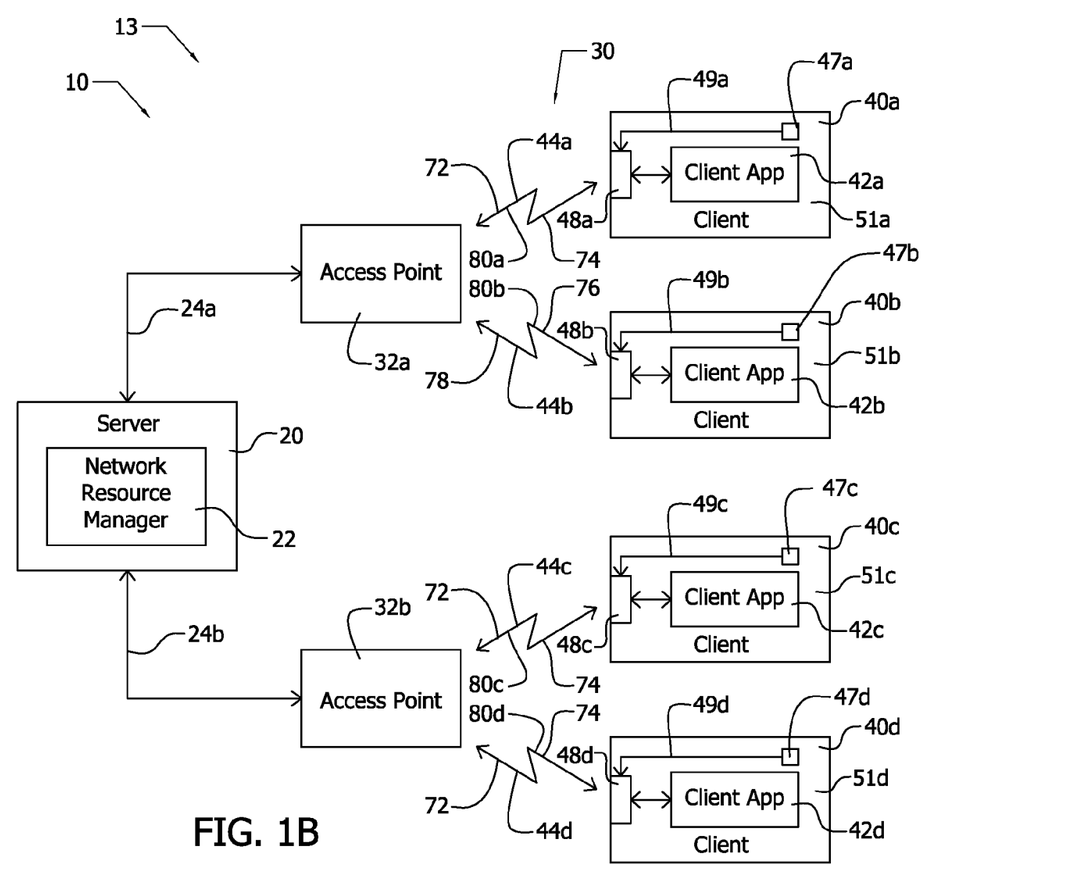
FIG. 1B illustrates by schematic diagram the exemplary implementation of a network communication system of FIG. 1A in a quiet state of operation; and, FIG. 2 illustrates by process flow chart an exemplary method of operation of the exemplary network communication system of FIG. 1.

FIGS. 1A, 1B illustrate exemplary communication system 10 that may limit congestion on network 30. As illustrated in FIGS. 1A, 1B, exemplary network communication system 10 includes server 20 that includes a computer, network 30, and clients 40a, 40b, 40c, 40d each of which includes a computer. Network communication system 10 is alterable between noisy state of operation 11 illustrated in FIG. 1A, and quiet state of operation 13 illustrated in FIG. 1B.

Network communication system 10 disclosed herein including network resource manager 22 and client apps 42a, 42b, 42c, 42d may be implemented, at least in part, as operable software, and various related methods, such as exemplary method 200 (see FIG. 2) are implemented in operable software. Compositions of matter are hereby disclosed herein that include non-transitory computer readable media comprising computer readable instructions that, when executed, cause one or more computers to function as at least portions of the network communication system 10 disclosed herein or to implement method steps of the methods, such as method 200, disclosed herein.

Software may be, for example, in the form of high-level code such as C or Java, or may be in the form of machine code. The software may, for example, execute on one computer. The software may, for example, execute in a container, such as a Docker Container. In other implementations, two or more computers may communicate with one another via network, and the software may be organized in various ways such that portions of the software may be distributed operatively over the two or more computers to be executed by the two or more computers. Although generally described as implemented by software for explanatory purposes, methods and apparatus disclosed herein may be implemented, at least in part, in hardware or firmware, or in various combination of hardware, firmware, and software, in various implementations. As would be recognized by those of ordinary skill in the art upon study of this disclosure, methods, apparatus, and compositions of matter disclosed herein may be practiced in distributed computing environments where certain tasks are performed by processors that are linked by network. A nominal representation of data may either be the data itself or a pointer, description, or other data that may be used to create the data.

As illustrated in FIGS. 1A, 1B, exemplary implementation of network communication system 10 includes server 20 in communication with clients 40a, 40b, 40c, 40d via network 30. As illustrated, network resource manager 22 is operatively received by server 20, and client apps 42a, 42b, 42c, 42d are operatively received by clients 40a, 40b, 40c, 40d, respectively. Network 30 of network communication system 10, as illustrated, includes access points 32a, 32b and pathways 44a, 44b, 44c, 44d. While pathways 44a, 44b, 44c, 44d as illustrated as implemented as wireless, it should be recognized that pathways 44a, 44b, 44c, 44d may be variously wired, wireless, or combinations of wired and wireless, in various implementations. As illustrated, server 20 including network resource manager 22 is in communication with access points 32a, 32b of network 30 via pathways 24a, 24b, respectively, and server 20 may control access points 32a, 32b. Pathways 24a, 24b may be variously wired, wireless, or combinations of wired and wireless, in various implementations. Clients 40a, 40b are in communication with access point 32a via pathways 44a, 44b and thence with server 20 via pathway 24a, in this implementation. Clients 40c, 40d are in communication with access point 32b via pathways 44c, 44d, respectively, and thence with server 20 via pathway 24b, in this implementation. Thus, in this exemplary implementation of network communication system 10, clients 40a, 40b, 40c, 40d including client app 42a, 42b, 42c, 42d, respectively, are in data communication with server 20 including network resource manager 22 via network 30, and server 20 including network resource manager 20 controls at least portions of network 30 in communication with clients 40a, 40b, 40c, 40d.

Client 40a, 40b, 40c, 40d includes client app 42a, 42b, 42c, 42d operatively received by operating system 51a, 51b, 51c, 51d, respectively, as illustrated. Operating system 51a, 51b, 51c, 51d and client app 42a, 42b, 42c, 42d communicate with network 30 via network stacks 48a, 48b, 48c, 48d, respectively, as illustrated. Clients 40a, 40b, 40c, 40d include corresponding data sources 47a, 47b, 47c, 47d operably linked with corresponding client app 42a, 42b, 42c, 42d, as illustrated. Data sources 47a, 47b, 47c, 47d may communicate data 49a, 49b, 49c, 49d with network 30 via network stacks 48a, 48b, 48c, 48d, respectively, as illustrated in FIGS. 1A, 1B. Each of data sources 47a, 47b, 47c, 47d may be, for example, a microphone, camera, or sensor, so that each of source data 49a, 49b, 49c, 49d may be audio data, video data, or sensor data, respectively, in correspondence to each of data sources 47a, 47b, 47c, 47d.

Network 30, as illustrated in FIGS. 1A, 1B, may be formed, in part, as a wireless LAN based upon, for example, 802.11 protocols, and network 30 may implement Internet Protocol. It should be understood that, in various other implementations, network 30 may include a network as used herein with network 30 being of local to global in scope. In various implementations, data may be communicated via network 30 by various wired and wireless technologies and combinations thereof.

Access points 32a, 32b and clients 40a, 40b, 40c, 40d of network communication system 10 are exemplary for explanatory purposes. Thus, various other implementations of communication system 10 may have various other configurations of network 30, may have various numbers of access points, such as access points 32a, 32b, and various numbers of clients, such as clients 40a, 40b, 40c, 40d, and various numbers of clients may be in communication with network 30. The number of clients, for example, may range from a single client to hundreds of clients, thousands of clients, or more, in various implementations.

As illustrated in FIG. 1A, network communication system 10 operates in noisy state of operation 11. Clients 40a, 40b, 40c, 40d including client app 42a, 42b, 42c, 42d and data source 47a, 47b, 47c, 47d, respectively, are in unrestricted data communication 62 with server 20 including network resource manager 22, and each of clients 40a, 40b, 40c, 40d may communicate unrestricted quantity of data 64, as illustrated in FIG. 1A. For example, unrestricted quantity of data 64 may be a capacity such as a maximum user signaling rate of network 30. In noisy state of operation 11, clients 40a, 40b, 40c, 40d may communicate with network 30 with generally the same priority.

As illustrated in FIG. 1B, network communication system 10, network communication system operates in quiet state of operation 13. In quiet state of operation 13, clients 40a, 40b, 40c, 40d are in communication with network 30 by VoIP connections 80a, 80b, 80c, 80d. Network resource manager 22 of server 20 has designated one of clients 40a, 40b, 40c, 40d as selected client 45 in quiet state of operation 13, as illustrated. For explanatory purposes, client 40b is designated as selected client 45, in this implementation. Selected client 45 is then in partly restricted data communication 76 with network 30 to communicate partly restricted quantity of data 78 with network 30, while clients 40a, 40c, 40d other than selected client 45 are in restricted data communication 72 with network 30 to communicate restricted quantity of data 74 with network 30, as illustrated. In other implementations, there may be more than one selected client 45.

VoIP connections 80a, 80b, 80c, 80d are implemented using Voice over Internet Protocol (VoIP), also called IP telephony. VoIP is a methodology and group of technologies for the delivery of voice communications and multimedia sessions over Internet Protocol networks, such as network 30. Voice over IP may be implemented in various ways using both proprietary VoIP protocols and open standard VoIP protocols. Exemplary VoIP protocols include Session Initiation Protocol (SIP), H.323, Media Gateway Control Protocol (MGCP), H.248, Real Time Transport Protocol (RTP), Real Time Transport Control Protocol (RTCP), Secure Real-time Transport Protocol (SRTP), Session Description Protocol (SDP), Inter-Asterisk eXchange (IAX), Extensible Messaging and Presence Protocol (XMPP), Jingle, and Skype protocol.

As illustrated in FIG. 1B, because client 40b has been designated as selected client 45, client 40b is in partly restricted data communication 76 with network 30. Selected client 45 communicates partly restricted quantity of data 78 with server 20 including network resource manager 22 via network 30, as illustrated. Clients 40a, 40c, 40d are in restricted data communication 72 with network 30, and, thus, clients 40a, 40c, 40d communicate restricted quantity of data 74 with network 30, as illustrated. In quiet state of operation 13, partly restricted data communication 76 of selected client 45 has a greater priority on network 30 than restricted data communication 72 of clients 40a, 40c, 40d, in this implementation. Because clients 40a, 40c, 40d communicate restricted quantity of data 74 with network 30 and because selected client 45 communicates partly restricted quantity of data 78 with network 30, congestion on network 30 may be reduced thereby reducing latency of partly restricted data communication 76 with network 30 by selected client 45, which has priority. Thus, at quiet state of operation 13 all clients 40a, 40b, 40c, 40d, are placed in a defined state wherein the clients 40a, 40b, 40c, 40d communicate either restricted quantity of data 74 or partly restricted quantity of data 78 with network 30, thereby minimizing network congestion thus reducing latency on network 30, in this implementation. In other implementations, selected client 45 may be in unrestricted data communication 62 to communicate unrestricted quantity of data 64 with network 30. In other implementations, clients 40a, 40b, 40c, 40d may be in various combinations of unrestricted data communication 62 to communicate unrestricted quantity of data 64, partly restricted data communication 76 to communicate partly restricted quantity of data 78, or restricted data communication 72 to communicate restricted quantity of data 74. Unrestricted quantity of data 64, restricted quantity of data 74, and partly restricted quantity of data may include source data 49a, 49b, 49c, 49d from data source 47a, 47b, 47c, 47d, respectively.

Partly restricted data communication 76 may be implemented, at least in part, by communicating only source data from the data source, such as source data 49a, 49b, 49c, 49d from data source 47a, 47b, 47c, 47d, respectively, with network 30. Restricted data communication 72 may be implemented, at least in part, by communicating only a portion of source data from the data source, such as source data 49a, 49b, 49c, 49d from data source 47a, 47b, 47c, 47d, respectively, with network 30. Source data 49a, 49b, 49c, 49d from data source 47a, 47b, 47c, 47d is communicated to network 30 through network stacks 48a, 48b, 48c, 48d, respectively. At least a portion of source data 49a, 49b, 49c, 49d may be dumped from network stacks 48a, 48b, 48c, 48d, respectively, before the remainder of the source data 49a, 49b, 49c, 49d, if any, is sent to network 30.

When clients 40a, 40c, 40d are in restricted data communication 72 with network 30, each of clients 40a, 40c, 40d as controlled by client apps 42a, 42b, 42c, respectively, communicates generally no more than restricted quantity of data 74. Restricted quantity of data 74 may be defined as a quantity of data minimally required to maintain data communication between each of clients 40a, 40c, 40d and network 30. For example, when client 40a is in restricted data communication 72, client app 42a may communicate the restricted quantity of data 74 with network resource manager 22 to maintain communication between client 40a and server 20, and network resource manager 22 may communicate the restricted quantity of data 74 with client app 42a to maintain data communication between network resource manager 22 and client 40a. For example, the restricted quantity of data 74 may be essentially zero, in some implementations. Communication of the restricted quantity of data 74 prevents VoIP connections 80a, 80c, 80d from timing out due to lack of activity, in this implementation.

When selected client 45 is in partly restricted data communication 76 as controlled by client app 42b, in this implementation, selected client 45 may communicate no more than partly restricted quantity of data 78 with network 30. Partly restricted quantity of data 78 may include data communications minimally required to maintain data communication between selected client 45 and network 30 and may include additional data communications. In various implementations, partly restricted quantity of data 78 may be greater than restricted quantity of data 74 but less than unrestricted quantity of data 64.

Figure 2:
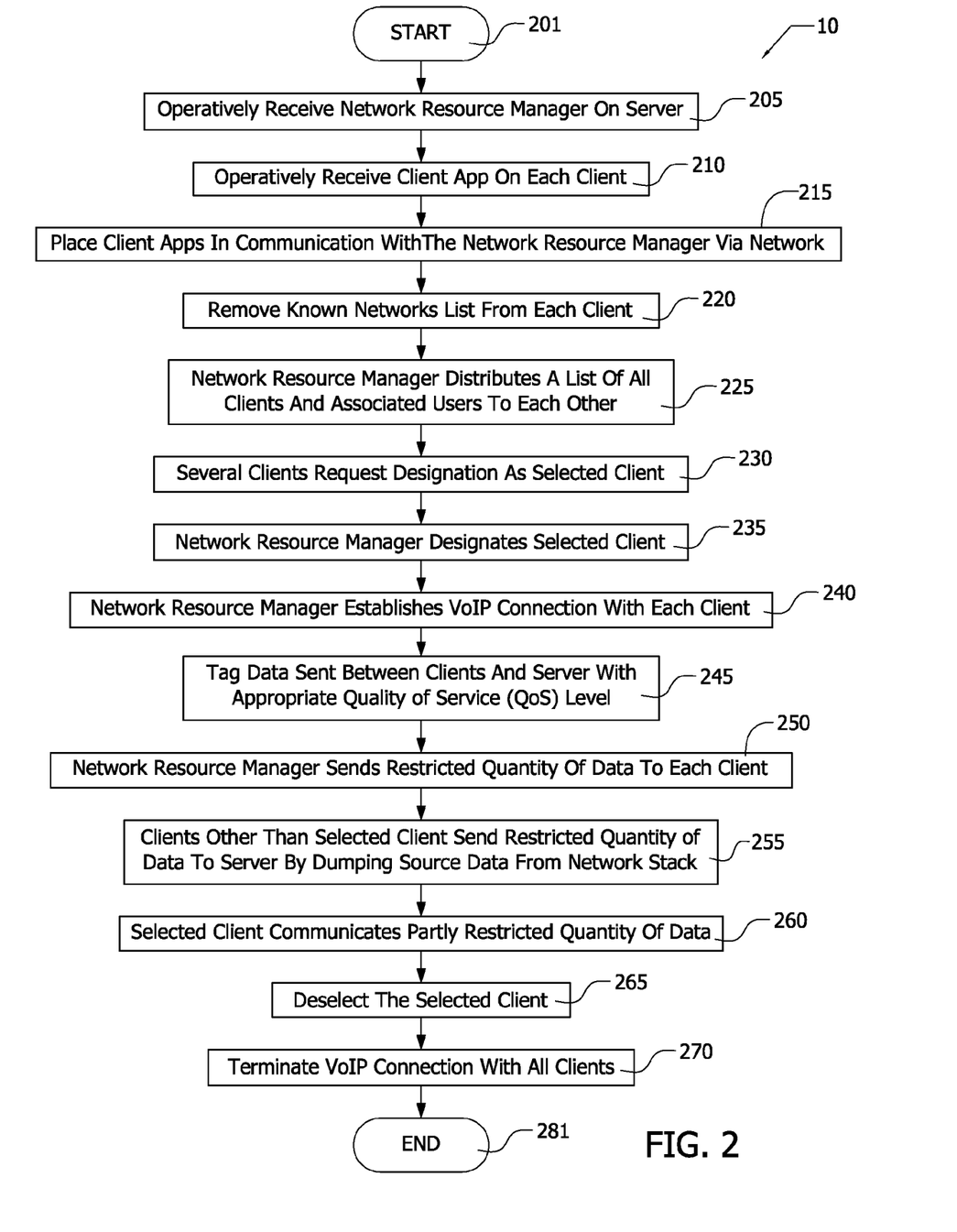

FIG. 2 illustrates an exemplary method 200 for limiting congestion on a network, such as network 30. Other implementations may, for example, include additional steps to those of exemplary method 200, various modifications of the steps of exemplary method 200, or may not include certain steps of exemplary method 200.

As illustrated in FIG. 2, exemplary method 200 alters a data communication system, such as data communication system 10, between a noisy state of operation, such as noisy state of operation 11 illustrated in FIG. 1A, and a quiet state of operation, such as quiet state of operation 13 illustrated in FIG. 1B. As illustrated in FIG. 2, method 200 is entered at step 201 with the data communication system being in the noisy state of operation.

At step 205, a network resource manager, such as network resource manager 22, is operatively received on a server, such as server 20.

At step 210, a client app, such as client app 42a, 42b, 42c, 42d, is operatively received onto each client, such as each of client 40a, 40b, 40c, 40d.

At step 215, the client apps are placed in communication with the network resource manager via a network, such as network 30. All clients including the corresponding client apps are now in communication in both directions with the server including the network resource manager via the network. All clients are in unrestricted data communication, such as unrestricted data communication 62, with the network, and all clients communicate an unrestricted quantity of data, such as unrestricted quantity of data 64, with the network. At step 215, the data communication system may, for example, conform to the data communication system in the noisy state of operation illustrated in FIG. 1A. Note that, in certain implementations, rogue clients meaning clients that have not received the client app or are otherwise not in communication with the network resource manager may be deauthenticated from the network by the network resource manager.

At step 220, the known networks list is removed from each client in order to prevent probing. The known network list may be restored as appropriate.

At step 225, the network resource manager on the server may distribute a list of all clients and associated users to every client app. The network resources manager requires the list of all clients and associated users, while having the list of all clients and associated users is optional for the clients. A profile of the user of each client such as a curriculum vitae, photo, Facebook page, or LinkedIn page may be selectively presented using the clients.

At step 230, one or more clients may request designation as a selected client, such as selected client 45, using the client app. The request for designation as the selected client is communicated from the client(s) to the network resource manager.

At step 235, the network resource manager designates the selected client (e.g., chooses one client to speak). The server designates the selected client from amongst the clients requesting designation as the selected client.

At step 240, the network resource manager on the server sends an instruction prompting the operating system, such as operating system 51a, 51b, 51c, 51d, on each client to establish a VoIP connection, such as VoIP connection 80a, 80b, 80c, 80d, between each client and the server. The client app may cooperate with the operating system in prompting the operating system to establish the VoIP connection. The VoIP connection gives the client app of the selected client exclusive access to the network thereby reducing background operations and network use to a minimum, in this implementation.

At step 245, restricted quantity of data, such as restricted quantity of data 74, and partly restricted quantity of data, such as partly restricted quantity of data 78, communicated between the clients and the server via the VoIP connections is tagged with an appropriate Quality of Service (QoS) level. The QoS level ensures that data packets that comprise the data receive an appropriate priority. QoS prioritizes a bandwidth relationship between individual application or protocols according to the following 5 classes:

Maximum—This class offers maximum priority and should be used sparingly.

Premium—Second highest bandwidth class, by default handshaking and ICMP packets fall into this class. Most VoIP and video services will function good in this class if Express is insufficient.

Express—The Express class is for interactive applications that require bandwidth above standard services so that interactive apps run smoothly.

Standard—All services that are not specifically classed will fall under standard class.

Bulk—The bulk class is only allocated remaining bandwidth when the remaining classes are idle. If the line is full of traffic from other classes, Bulk will only be allocated 1% of total set limit. Use this class for P2P and downloading services like FTP.

Bandwidth may be allocated using QoS based on the following "minimum to maximum" percentages of downlink and uplink values for each class:

Maximum: 75%-100%

Premium: 50%-100%

Express: 25%-100%

Standard: 15%-100%

Bulk: 5%-100%

For example, 10,000 kbit of uplink traffic, "Standard" class traffic can be reduced and de-prioritized to 15% or 1,500 kbit when a concurrent express or higher priority service requires the down/uplink pipe at the same time.

Upon completion of step 245, all clients other than the selected client are in restricted data communication with the network. The selected client is in partly restricted data communication with the network upon completion of step 245.

At step 250, the network resource manager on the server sends restricted quantity of data to each client, for example, in order to maintain data communication with each client or test network performance. In certain implementations, the restricted quantity of data sent to the selected client may differ from the restricted quantity of data sent to clients other than the selected client. The restricted quantity of data communicated to all clients at step 250 may include commands that trigger each client's operating system, such as operating system 51a, 51b, 51c, 51d, to activate a data source, such as data source 47a, 47b, 47c, 47d, operatively engaged with the client to generate source data, such as source data 49a, 49b, 49c, 49d. Generating source data may be done in a loop having high priority that continuously triggers each client to activate the corresponding data source. Note that, in certain implementations, the restricted quantity of data sent to the selected client may comprise, for example, a side-tone.

At step 255, clients other than the selected client communicate restricted quantities of data with the network such as the resource manager on the server in order to maintain data communication with the server. Restricted quantities of data communicated with the network resource manager at step 255 may be indicative, for example, of signal strength, latency, timing information, and location. In certain implementations, no data is sent from clients other than the selected client to the server. To achieve this minimization of data communication from each client other than the selected client, each client other than the selected client is behaving as if taking part in a low-latency data communication. Although the client app on each client other than the selected client, for example, generates source data from the data source operatively engaged with the client, the source data may be dumped from a network stack, such as network stack 48a, 48b, 48c, 48d before being sent to the network as the restricted quantity of data in various ways, as would be readily recognized by those of ordinary skill in the art upon study of this disclosure. For example, source data may be placed in a buffer operably included with the network stack and then at least a portion thereof dumped from the buffer before the remainder of the source data, if any, is sent to the network through the network stack as the restricted quantity of data.

At step 255, each client other than the selected client is prohibited from probing the network, and each client other than the selected client is communicating restricted data via the network.

At step 260, the selected client communicates the partly restricted quantity of data with the network resource manager on the server via the network. The partly restricted quantity of data may include all source data generated by the data source of the selected client. The server including the network resource manager may utilize the partly restricted quantity of data, for example, to output audio from the data source of the selected client to an audience. When the selected client is in partly restricted data communication, the selected client may be restricted from certain types of data communications with the network such as email communications, web browsing, text messaging, and so forth, as would be readily recognized by those of ordinary skill in the art upon study of this disclosure. The network communication system is operating in the quiet state of operation at step 260.

At step 265, the selected client is undesignated by the network resource manager on the server. Another client may then be designated at the selected client.

At step 270, the network resource manager terminates the VoIP connection with all clients. Upon termination of the VoIP connection at step 270, the network communication is altered from the quiet state of operation to the noisy state of operation. All clients are now in unrestricted data communication with the network following termination of the VoIP connections.

Method 200 terminates at step 281.

The foregoing discussion along with the Figures discloses and describes various exemplary implementations only. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method of network operation, comprising the steps of:
   (A) registering with a network resource manager each client of several clients, each client communicating with a network, and a client app installed on each client communicating with the network resource manager via the network;
   (B) placing the network in a quiet state of operation while communicating data from a data source of a selected client by restricting data being communicated with the network from all clients of the several clients by performing the steps of:
      (i) opening a data source of each client by establishing by the client app of each client, upon direction by the network resource manager, a VoIP connection having a quality of service (QoS) enabled between the data source of each client and the network thereby triggering a process of an operating system of each client that restricts data being communicated with the network from each client other than data from the data source;
      (ii) dumping at each client other than the selected client at least a portion of data being generated by the data source of each client other than the selected client thereby preventing communication of the at least a portion of data being generated by the data source of each client other than the selected client with the network; and
      (iii) communicating all data from the data source of the selected client with the network;
   and
   (C) placing the network from the quiet state of operation into a noisy state of operation, upon direction by the network resource manager to the client app on each client of the several clients, by closing the VoIP connection between the data source of each client and the network thereby closing the data source and unrestricting data being communicated with the network from all clients.

2. The method of claim 1, wherein the step of opening a data source of each client by establishing by the client app of each client, upon direction by the network resource manager, a VoIP connection having a quality of service (QoS) enabled between the data source of each client and the network thereby triggering a process of an operating system of each client that restricts data being communicated with the network from each client other than data from the data source:
   setting a QoS level for each client of the several clients.

3. The method of claim 1,
   wherein data from the data source of the selected client is being communicated with the network resource manager.

4. The method of claim 1,
   wherein the step of activating a data source of each client comprises the step of generating data by the data source of each client of the several clients.

5. The method of claim 1, wherein the data source is selected from a group consisting of a microphone, a camera, and a sensor.

6. The method of claim 1, wherein the step of dumping at each client other than the selected client at least a portion of data being generated by the data source of each client other than the selected client comprises dumping data from a network stack on at least one client of the several clients.

7. The method of claim 1, wherein the VoIP connection is established between the data source of each client of the several clients and the network resource manager.

8. The method of claim 1, wherein no data generated by the data source of at least one client other than the selected client is being communicated with the network.

* * * * *